United States Patent
Shin et al.

(10) Patent No.: US 12,104,948 B2
(45) Date of Patent: Oct. 1, 2024

(54) OPTICAL MEASUREMENT DEVICE WITH UNIVERSAL METASURFACE AND OPTICAL MEASURING METHOD USING THE SAME

(71) Applicant: KOREA ADVANCED INSTITUTE OF SCIENCE AND TECHNOLOGY, Daejeon (KR)

(72) Inventors: Jonghwa Shin, Daejeon (KR); Taeyong Chang, Daejeon (KR); Joonkyo Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/232,506

(22) Filed: Aug. 10, 2023

(65) Prior Publication Data
US 2023/0384152 A1    Nov. 30, 2023

Related U.S. Application Data

(63) Continuation of application No. PCT/KR2022/002033, filed on Feb. 10, 2022.

(30) Foreign Application Priority Data

Feb. 10, 2021 (KR) .................. 10-2021-0018841
Feb. 10, 2022 (KR) .................. 10-2022-0017236

(51) Int. Cl.
*G01J 1/04* (2006.01)
*G01J 4/00* (2006.01)
(Continued)

(52) U.S. Cl.
CPC .............. *G01J 1/0407* (2013.01); *G01J 4/00* (2013.01); *G01J 9/02* (2013.01); *G02B 21/0092* (2013.01)

(58) Field of Classification Search
CPC .... G01J 1/0407; G01J 4/00; G01J 9/02; G01J 4/04; G02B 21/0092; G02B 21/00; G01B 9/02
See application file for complete search history.

(56) References Cited

U.S. PATENT DOCUMENTS

2020/0271843 A1    8/2020  Kim et al.
2020/0348500 A1*  11/2020  Kwon ................. G01J 9/02

FOREIGN PATENT DOCUMENTS

KR    10-2018-0119428 A    11/2018
KR    10-2019-0038221 A     4/2019
(Continued)

OTHER PUBLICATIONS

International Search Report No. PCT/ KR2022/002033 Issued on May 18, 2022 (2 Pages in English).

*Primary Examiner* — Thanh Luu
*Assistant Examiner* — Monica T Taba
(74) *Attorney, Agent, or Firm* — NSIP Law

(57) ABSTRACT

An optical measurement device according to an aspect of the present disclosure includes a universal metasurface on which light is incident, a polarization sensor configured to measure a polarization state of light passing through the universal metasurface, and a controller configured to collect a quantitative differential interference contrast (QDIC) image for the x polarization of incident light that is collected by the polarization sensor, a QDIC image for y polarization, and a quantitative relative phase (QRP) image representing a relative phase difference between the x polarization and y polarization and configured to calculate intensity, a phase or polarization information of the incident light.

17 Claims, 20 Drawing Sheets

(51) Int. Cl.
  *G01J 9/02* (2006.01)
  *G02B 21/00* (2006.01)

(56) References Cited

FOREIGN PATENT DOCUMENTS

| WO | WO 2018/047165 A1 | 3/2018 |
| WO | WO 2022/173240 A2 | 8/2022 |

* cited by examiner

100

1st layer

2nd layer

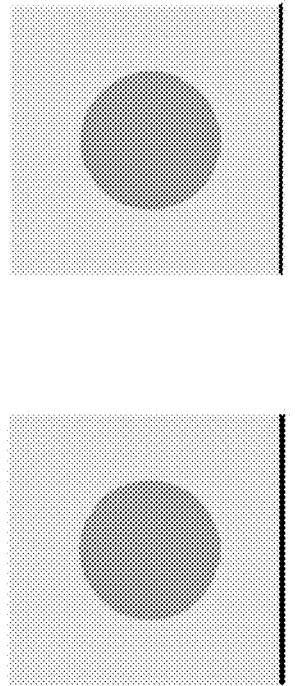
FIG. 11A  FIG. 11B  FIG. 11C  FIG. 11D
$$\phi_x(x,y) = \phi_x(x,y_0) + \int_{y_0}^{y} \frac{\partial \phi_x}{\partial y} dx$$
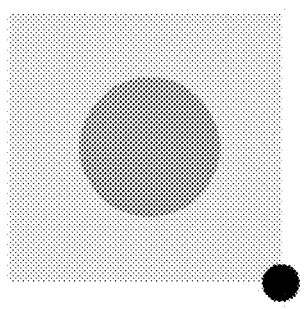
$\phi_x(x_0, y_0)$
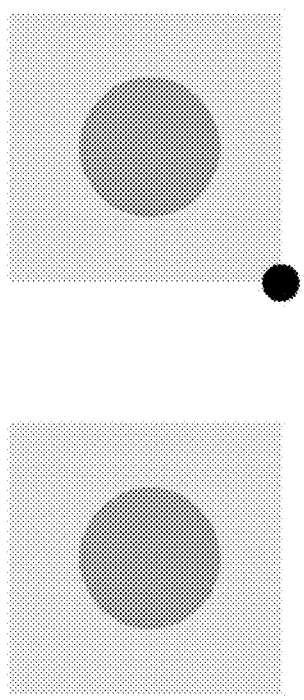
$$\phi_x(x, y_0) = \phi_x(x_0, y_0) + \int_{x_0}^{x} \frac{\partial \phi_x}{\partial x} dx$$
$$\phi_y(x, y_0) = \phi_x(x, y_0) + \phi_{QRP}(x, y_0)$$
$$= \phi_x(x, y_0) + (\phi_y(x, y_0) - \phi_x(x, y_0))$$
FIG. 11E  FIG. 11F
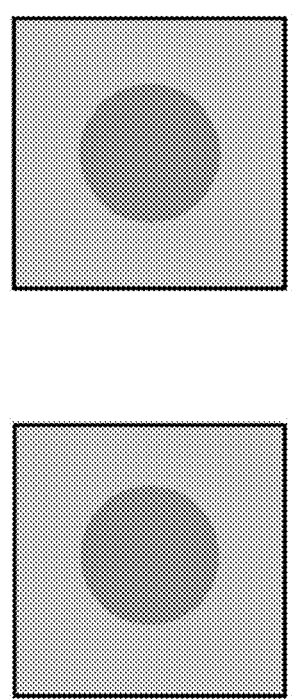
$$\phi_y(x, y) = \phi_y(x, y) - \phi_{QRP}(x, y)$$
$$= \phi_x(x, y) - (\phi_y(x, y) - \phi_x(x, y))$$

FIG. 12

$$|x\rangle \to \underbrace{g(\delta + \Delta\delta, 0, f_0)|R\rangle + g(\delta, 0, f_0)|L\rangle}_{\text{QDIC } \frac{\partial \phi_x}{\partial x}} + \underbrace{g(0, \delta + \Delta\delta, f_0)|R\rangle + g(0, \delta, f_0)|L\rangle}_{\text{QDIC } \frac{\partial \phi_x}{\partial y}} + \underbrace{g(0,0, f_0)|R\rangle}_{\text{QRP}}$$

$$|y\rangle \to \underbrace{g(-\delta + \Delta\delta, 0, f_0)|R\rangle + g(-\delta, 0, f_0)|L\rangle}_{\text{QDIC } \frac{\partial \phi_2}{\partial x}} + \underbrace{g(0, -\delta + \Delta\delta, f_0)|R\rangle + g(0, -\delta, f_0)|L\rangle}_{\text{QDIC } \frac{\partial \phi_2}{\partial y}} + g(0,0, f_0)|L\rangle$$

$$g(\delta_x, \delta_y, f_0) = \exp\left(-j \frac{2\pi}{\lambda} \sqrt{f_0^2 + x^2 + y^2}\right) \exp[j(k_x x + k_y y)]$$

$$k_x = k_0 \frac{\delta_x}{\sqrt{(2f_0)^2 + \delta_x^2 + \delta_y^2}} \qquad k_y = k_0 \frac{\delta_y}{\sqrt{(2f_0)^2 + \delta_x^2 + \delta_y^2}}$$

*FIG. 15*

$$|x\rangle \to g(\delta + \Delta\delta, 0, f_0)|R\rangle + g(\delta, 0, f_0)|L\rangle + g(0,0,f_0)|R\rangle$$

$$\underbrace{\qquad\qquad\qquad\qquad\qquad\qquad}_{\text{QDIC } \frac{\partial \phi_x}{\partial x}} \qquad\qquad \text{QRP}$$

$$|y\rangle \to g(0, -\delta + \Delta\delta, f_0)|R\rangle + g(0, -\delta, f_0)|L\rangle + g(0,0,f_0)|L\rangle$$

$$\underbrace{\qquad\qquad\qquad\qquad\qquad\qquad}_{\text{QDIC } \frac{\partial \phi_y}{\partial y}}$$

$$g(\delta_x, \delta_y, f_0) = \exp\left(-j\frac{2\pi}{\lambda}\sqrt{f_0^2 + x^2 + y^2}\right)\exp[j(k_x x + k_y y)]$$

$$k_x = k_0 \frac{\delta_x}{\sqrt{(2f_0)^2 + \delta_x^2 + \delta_y^2}} \qquad k_y = k_0 \frac{\delta_y}{\sqrt{(2f_0)^2 + \delta_x^2 + \delta_y^2}}$$

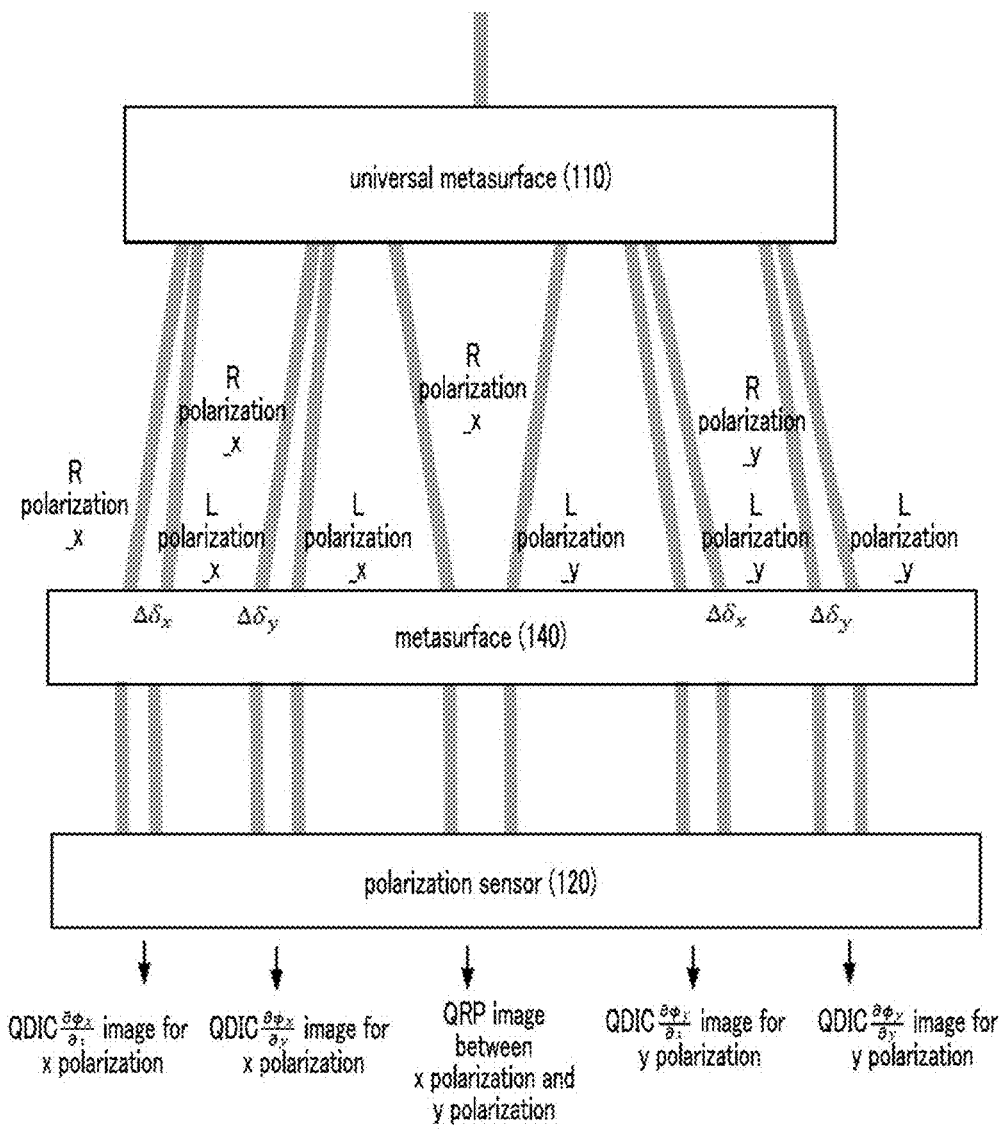

ately* imaging unit (QPIU) technology measures a
OPTICAL MEASUREMENT DEVICE WITH UNIVERSAL METASURFACE AND OPTICAL MEASURING METHOD USING THE SAME

CROSS-REFERENCE TO RELATED APPLICATION

This application is a continuation of International Application No. PCT/KR2022/002033 filed on Feb. 10, 2022, which claims the benefit under 35 USC 119(a) of Korean Patent Application No. 10-2022-0017236 filed on Feb. 10, 2022, and Korean Patent Application No. 10-2021-0018841 filed on Feb. 10, 2021, in the Korean Intellectual Property Office, the entire disclosures of which are incorporated herein by reference for all purposes.

BACKGROUND

The present disclosure relates to an optical measurement device with a universal metasurface and an optical measuring method using the same.

Light interacts with a material in various ways. In this case, the light scattered due to interaction with the material indirectly includes information on the material. By analyzing the scattered light, information on the material may be obtained. As a representative example, a microscope is used to visualize information on a shape of a sample by measuring the intensity of scattered light. Accurate and quantitative measurement of the scattered light is essential for good performance of optical measurements using light. However, while a sample may have different types of information on each of three main characteristics of light, intensity, a phase, and polarization, cameras widely used for measurement have a limitation in that the cameras may only read light intensity information.

Until now, no method has been proposed to directly measure a phase and a polarization state. However, methods for indirectly measuring a phase and polarization by converting phase-related information into intensity-related information by using light interference have been studied in various fields.

As the known first technology, it is known that a quantitative phase imaging unit (QPIU) technology measures a quantitative phase of a sample through an interferogram obtained from interference between a sample beam and a reference beam by distinguishing the sample beam and the reference beam with a difference in light path according to polarization. There is an advantage in that intensity and phase information of a sample may be simultaneously known and setup of a device is relatively simple. However, there is a limit in that real-time measurement is impossible because three or four interferograms are required with several different phase differences when interference occurs between the reference beam and the sample beam for quantitative measurement. In addition, there is a limitation in that a sample with anisotropy may not be measured because interference by a uniform reference beam is required, the sample has to be sparse, and different polarizations are used for measurement.

As the known second technology, there is a differential interference contrast (DIC) microscopy technology based on metasurface. A DIC-type microscopy is a method of measuring a slope of a quantitative phase from an interferogram in which images of a sample are overlapped with spatially minute differences according to polarization. Unlike QPIU, measurement may be made regardless of the spatial distribution of a sample to be observed. Like QPIU, three or four interferograms using different phase differences are required, but a method for obtaining quantitative phase information with one measurement by obtaining three interferograms at a time using a metasurface has been proposed recently. However, different polarizations are used for measurement, and accordingly, there is a limitation in that samples with anisotropy may not be measured.

As the known third technology, there is a polarization camera technology using a metasurface. Information on polarization may be obtained indirectly from intensity information by using a linear polarization plate and a quarter-wave plate. In general, quantitative polarization information may be obtained by using images obtained with a combination of three or four alignment states of the linear polarization plate, and recently, a method of analyzing polarization in one measurement by using a metasurface has been proposed. However, this measurement method has a limitation in that only polarization information may be obtained from the intensity and relative phase difference between two linear polarizations, but an absolute phase value may not be obtained.

In this way, the study of measuring three main characteristics of light at once remains as a problem that has not been completely solved to date, despite the importance in optical measurement. The present disclosure proposes an optical measurement device capable of overcoming the limitations and obtaining quantitative information on intensity, a phase, and a polarization state of light with a single measurement by utilizing a universal metasurface structure which has been recently researched.

SUMMARY

The present disclosure provides an optical measurement device that includes a universal metasurface and a polarization sensor and measures together intensity, a phase, and polarization of light.

Technical problems to be solved by the present disclosure is not limited to the technical problems described above, and there may be other technical problems.

An optical measurement device according to an aspect of the present disclosure includes a universal metasurface on which light is incident, a polarization sensor configured to measure a polarization state of light passing through the universal metasurface, and a controller configured to collect a quantitative differential interference contrast (QDIC) image for the x polarization of incident light that is collected by the polarization sensor, a QDIC image for y polarization, and a quantitative relative phase (QRP) image representing a relative phase difference between the x polarization and y polarization and configured to calculate intensity, a phase or polarization information of the incident light.

An operating method of an optical measurement device according to another aspect of the present disclosure includes measuring, through a polarization sensor, a quantitative differential interference contrast (QDIC) image for x polarization generated through the universal metasurface of the optical measurement device, a QDIC image for y polarization, and a quantitative relative phase (QRP) image representing a relative phase difference between the x polarization and the y polarization, calculating light intensity of input light based on a measurement value of the polarization sensor, calculating a phase of the x polarization and a phase of the y polarization from the QRP image and a slope of a phase acquired from the QDIC image and, and calculating polarization state information based on the light intensity, the phase of the x polarization, and the phase of the y polarization.

According to the method of the present disclosure, a device for quantitatively measuring intensity, a phase, and polarization of light may be provided. Because a technology is based on DIC, and thus, there is no decrease in spatial resolution like QPIU, and because intensity and a phase of x polarization and y polarization are measured separately, a sample with anisotropy may also be measured.

In addition, easy commercialization may be made through a simple structure that adds a universal metasurface to a previously known commercialized polarization sensor.

BRIEF DESCRIPTION OF THE DRAWINGS

Embodiments will be more clearly understood from the following detailed description taken in conjunction with the accompanying drawings in which:

FIGS. 10A, 10B, 11A, 11B, 11C, 11D, 11E and 11F illustrate a process of measuring a phase by using a universal metasurface, according to an embodiment of the present disclosure;

FIG. 12 mathematically illustrates a function that is performed by a universal metasurface according to an embodiment of the present disclosure;

FIG. 15 mathematically illustrates a function that is performed by a universal metasurface according to the second embodiment of the present disclosure;

FIG. 16 illustrates a configuration of an optical measurement device according to a third embodiment of the present disclosure;

DETAILED DESCRIPTION OF THE EMBODIMENTS

Figure 1:
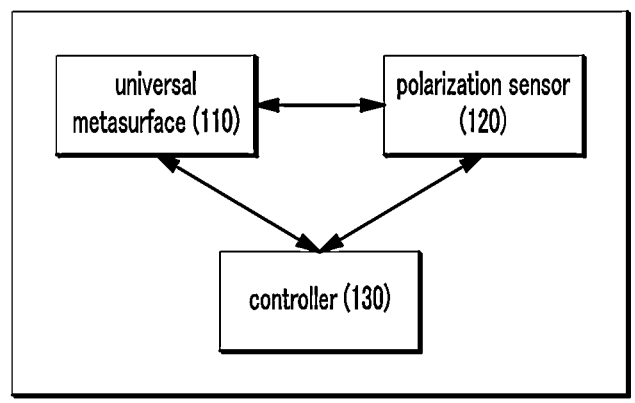
FIG. 1 is a block diagram illustrating an optical measurement device according to an embodiment of the present disclosure.

Hereinafter, embodiments of the present application are described in detail such that those skilled in the art to which the present disclosure belongs may easily practice the embodiments with reference to the accompanying drawings. However, the present disclosure may be implemented in many different forms and is not limited to the embodiments described herein. In addition, in order to clearly describe the present disclosure in the drawings, parts irrelevant to the descriptions are omitted, and similar reference numerals are attached to similar parts throughout the specification.

Throughout the present specification, when a portion is described to be "connected" to another portion, this includes not only a case where the portion is "directly connected" thereto, but also a case where the portion is "electrically connected" thereto with another element therebetween.

Throughout the present specification, when a member is described to be located "at" another member, this includes not only a case where the member is in contact with another member, but also a case where another member exists between the two members.

Hereinafter, embodiments of the present disclosure are described in detail with reference to the accompanying drawings.

FIG. 1 is a block diagram illustrating an optical measurement device according to an embodiment of the present disclosure.

As illustrated in FIG. 1, an optical measurement device 100 includes a universal metasurface 110, a polarization sensor 120, and a controller 130 that controls operations thereof. The optical measurement device 100 may be implemented in the form of a camera or a microscope.

The universal metasurface 110 is a surface on which light is incident, and thereby, intensity, a phase, and a polarization state of light are adjusted. A detailed configuration thereof is described below.

The polarization sensor 120 measures the intensity of light passing through the universal metasurface 110 and at the same time measures some information on a polarization state and indicates a generally known polarization camera or a charge-coupled device (CCD) sensor included in the polarization camera.

The controller 130 collects a quantitative differential interference contrast (QDIC) image for the x-polarized light of incident light collected through the polarization sensor, a QDIC image for the y-polarized light, and a quantitative relative phase (QRP) image representing a relative phase difference between the x-polarized light and the y-polarized light, and calculates intensity, a phase or polarization information of the incident light.

The controller 130 is, for example, a data processing device embedded in hardware, and may include a microprocessor, a central processing unit (CPU), a processor core, and a multiprocessor, an application-specific integrated circuit (ASIC), or a field programmable gate array (FPGA), but the scope of the present disclosure is not limited thereto.

Figure 2:
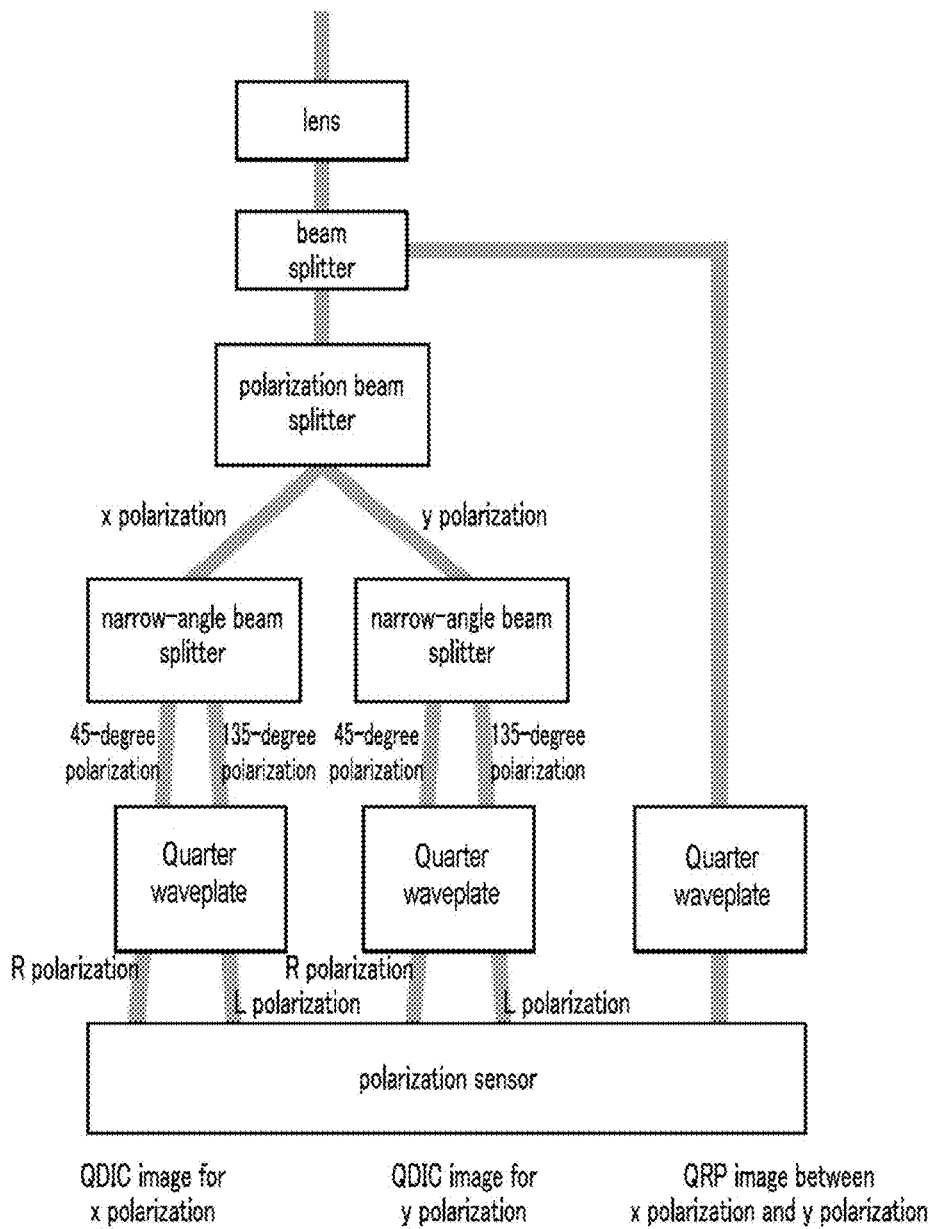
FIG. 2 illustrates a conceptual diagram of an optical measurement device according to the present disclosure.

FIG. 2 illustrates a conceptual diagram of an optical measurement device according to the present disclosure. The diagram explains the function of the proposed imaging device by replacing it with well-known bulk optics.

Particularly, a function that is performed by the universal metasurface 110 is illustrated therein. First, the universal metasurface 110 performs functions of a lens on which incident light is incident, a beam splitter that splits the incident light, a polarization beam splitter, narrow-angle beam splitters, and quarter waveplate. Incident light passing through the lens is split into two a first beam and a second beam by the beam splitter, the first beam is incident on the polarization beam splitter, and the second beam is incident on the quarter polarization plate. The first beam is split into an x-polarization beam and a y-polarization beam by the polarization beam splitter, which pass through narrow-angle beam splitters and quarter polarization pleats to be used to respectively generate a QDIC image for x polarization and a QDIC image for y polarization. Intensity and phase information of each polarization is obtained from the QDIC image for x polarization and the QDIC image for y polarization. In addition, the second beam is incident on the quarter polarization plate and then used to acquire a QRP image obtained by measuring a relative phase difference between an x-polarization beam and a y-polarization beam.

Through this configuration, a polarization state of the incident light may be obtained from the intensity and relative phase difference information of an x-polarization beam and a y-polarization beam. Particularly, when a QDIC image is generated through interference of right-circular polarization (RCP) and left-circular polarization (LCP), phase information appears as an azimuth angle of a polarization ellipse, and accordingly, a polarization sensor may measure a phase at once without any spatial resolution reduction. In addition, because QDIC images for x-polarization and y-polarization are separately generated, intensity and a phase may be quantitatively measured even when a sample is not isotropic. In addition, because a QRP image representing a quantitative relative phase between x-polarization beam and y-polarization beam is obtained, all information of polarization, phase, and intensity of the incident light may be quantitatively obtained by combining pieces of information of the three images. As a result, it is possible to measure intensity, a phase, and polarization of incident light at once even for an anisotropic sample that is not sparse.

Figure 3:
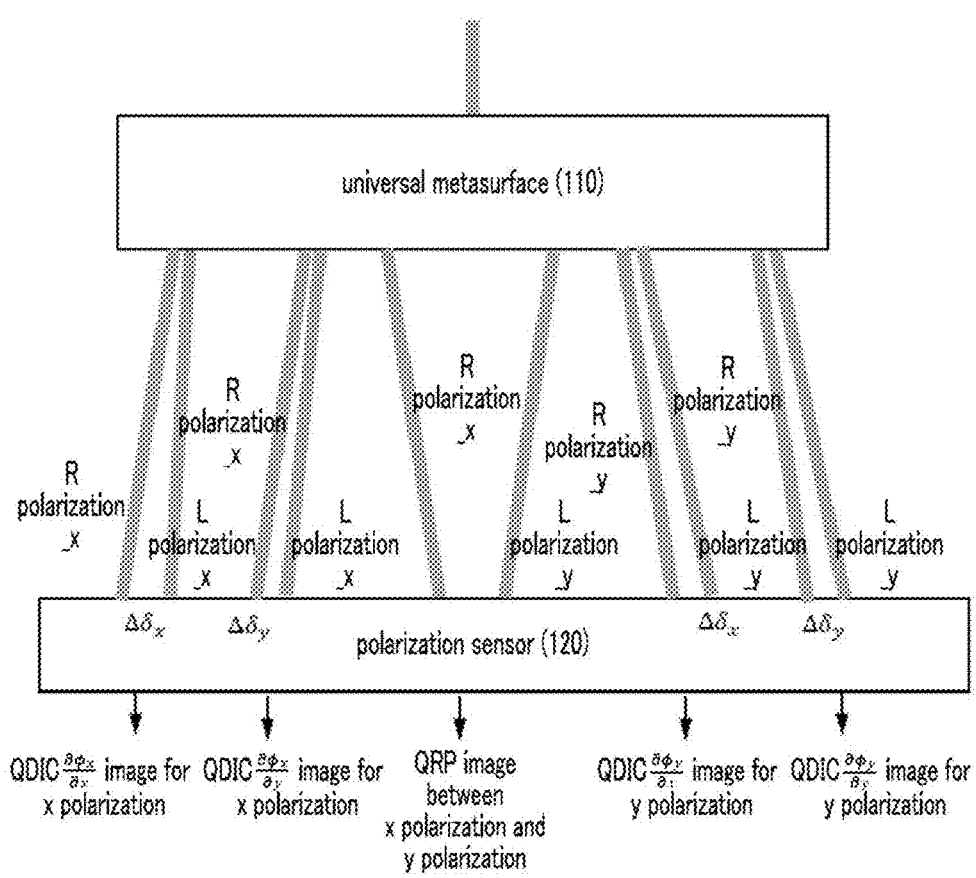
FIG. 3 illustrates a configuration of an optical measurement device according to a first embodiment of the present disclosure.
Figure 4:
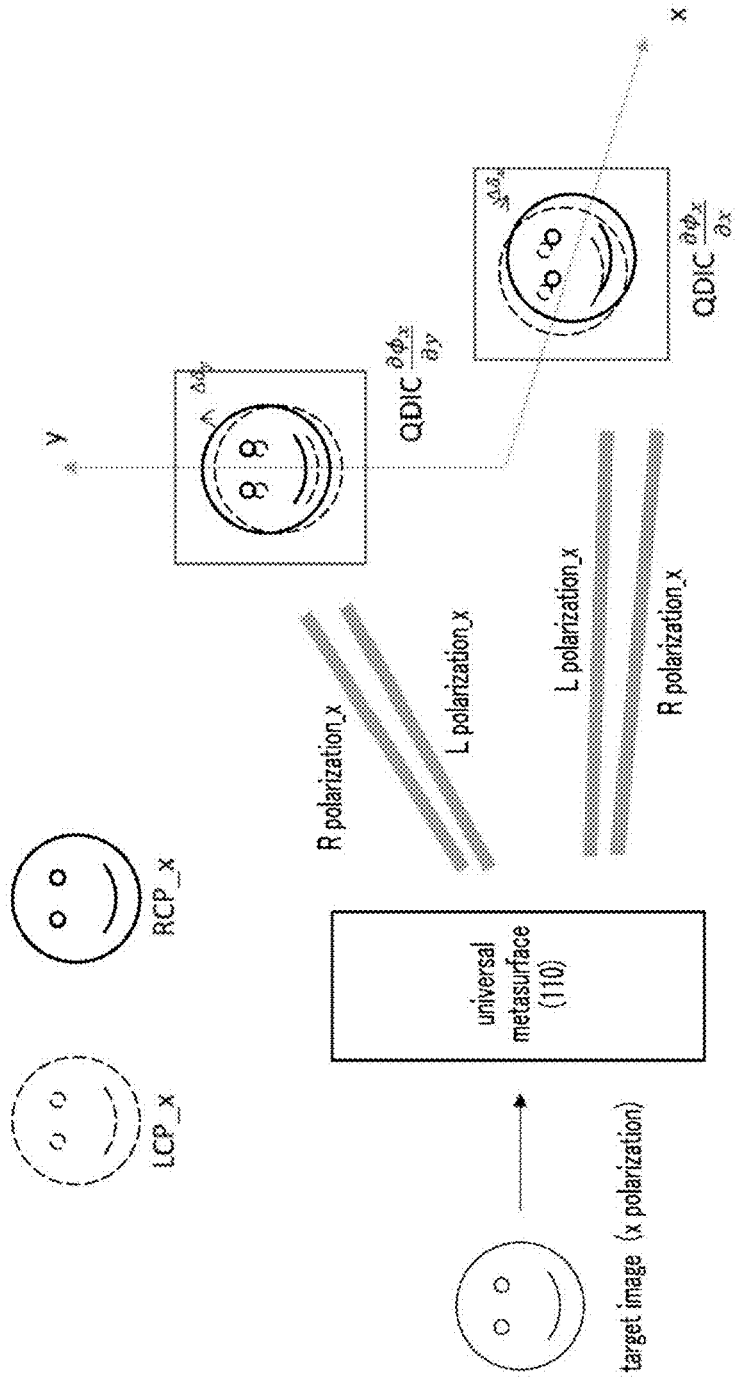
FIGS. 4 and 5 are diagrams illustrating an operation of the optical measurement device according to the first embodiment of the present disclosure.
Figure 5:
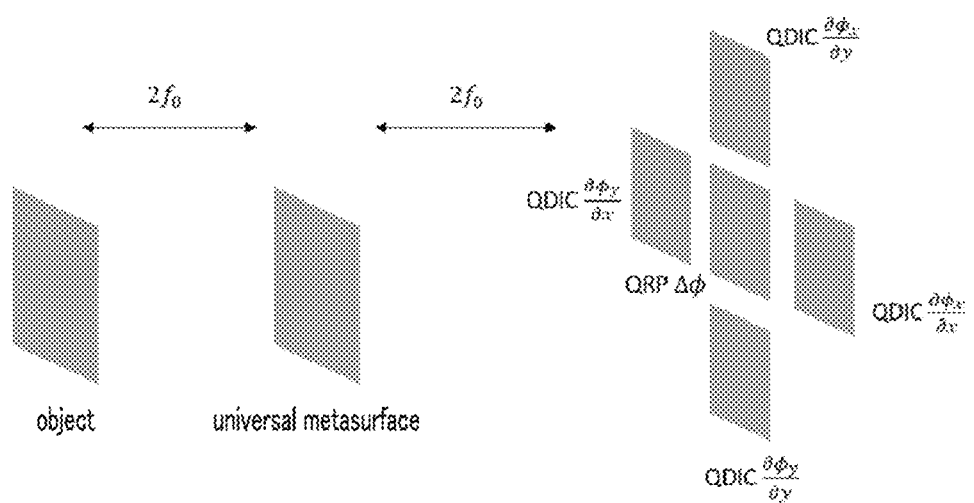

FIG. 3 illustrates a configuration of the optical measurement device according to the first embodiment of the present disclosure, and FIGS. 4 and 5 are diagrams illustrating operations of the optical measurement device according to the first embodiment of the present disclosure.

As illustrated in FIG. 3, the universal metasurface 110 acquires x polarization of incident light and y polarization of the incident light, and provides R polarization and L polarization for the x polarization, and R polarization and L polarization for the y polarization, accordingly, a QDIC image for the x polarization, a QDIC image for the y polarization, and a QRP image between the x polarization and the y polarization may be collected through the polarization sensor 120.

In addition, as illustrated in FIG. 4, a QDIC image $$QDIC \frac{\partial \phi_x}{\partial y}$$

for x polarization may be generated by using R polarization and L polarization from the x polarization with a small difference $\Delta\delta_y$ in a y-axis direction, and a QDIC image $$QDIC \frac{\partial \phi_x}{\partial x}$$

for x polarization may be generated by using R polarization and L polarization from the x polarization with a small difference $\Delta\delta_x$ in an x-axis direction. Similarly, a QDIC image $$QDIC \frac{\partial \phi_y}{\partial y}$$

for y polarization may be generated by using R polarization and L polarization from the y polarization with a small difference $\Delta\delta_y$ in the y-axis direction, and a QDIC image $$QDIC \frac{\partial \phi_y}{\partial x}$$

for y polarization may be generated by using R polarization and L polarization from the y polarization with a small difference $\Delta\delta_x$ in the x-axis direction.

In this case, the universal metasurface 110 has a two-layer structure and may implement a Jones matrix that changes spatially, and accordingly, an any electromagnetic field distribution may be generated with a high spatial resolution. By unique characteristics of the universal metasurface, the incident light is separated according to polarization to generate a QDIC image based on circular polarization, while a system that acquires a QRP image between x polarization and y polarization at once may be implemented, as illustrated in FIGS. 3 to 5. In this case, the QRP image may be arranged in the central region, and the QDIC image may be arranged around the QRP image. However, this is only an example, and the arrangement of the QRP image and the QDIC image may be modified in other forms.

FIGS. 6 to 8B are views illustrating a detailed configuration of the universal metasurface according to embodiment of the present disclosure.

The universal metasurface 110 includes a first-layer metasurface and a second-layer metasurface as a dual-layer metasurface. For example, the first-layer metasurface is formed on a substrate and includes a first host material and a first plurality of structures, and the second-layer metasurface is formed on the first-layer metasurface and includes a second plurality of structures. In this case, the first plurality of structures and the second plurality of structures may be arranged independently and apart from each other. The substrate may be a glass substrate, and each of the first plurality of structures and the second plurality of structures may include silicon, but is not limited thereto. In addition, the first host material supports the first plurality of structures and may include epoxy-based photoresist (SU-8), and is not limited as long as a transparent dielectric is used. In addition, the transparent material may be lower in refractive index than the first plurality of structures.

In addition, each of the first plurality of structures and the second plurality of structures may have a shape of a rectangular parallelepiped, an elliptical column, a semi-ellipsoid, or a lying semi-cylindrical column.

In addition, each of the first plurality of structures and the second plurality of structures may include one material selected from a group consisting of a metal, a metal mixture, an alloy, an inorganic material, an organic/inorganic hybrid material, and a combination thereof. For example, the inorganic material may include one material selected from among an oxide, a nitride, a semiconductor having low optical loss at a target wavelength, and a dielectric material, but may not be limited thereto. The oxide may include one selected from $SiO_2$, ZnO, $Al_2O_3$, ITO, $TiO_2$, $ZrO_2$, $HfO_2$, and $SnO_3$, and the nitride may include $Si_3N_4$ or nitrides of a transition metal, but is not limited thereto. In addition, the semiconductor may include Si, Ge, GaP, GaN, GaAs, InP, InGaAs, InGaAsP, and so on, but is not limited thereto.

Also, the first host material may include a gaseous material, a liquid material, or a solid material. For example, the gaseous material may include air, nitrogen, or an inert gas, and the inert gas may specifically include argon gas, but is limited thereto. For example, the solid material may be a low refractive index dielectric material such as $SiO_2$, $MgF_2$, or NaF, or an organic material such as poly(methyl methacrylate), polystyrene, or polycarbonate, or a material including pores such as expandable polystyrene, but is not limited thereto.

Also, the first plurality of structures may include two or more first-layer structure groups, each of the first-layer structure groups may include structures having different shapes from each other, and the second plurality of structures may include two or more second-layer structure groups, and each of the second-layer structure groups may include structures having the same shape.

In addition, the first plurality of structures and the second plurality of structures each have a shape of an elliptical column, and at least one of a length of a long axis, a length of a short axis, and an angle θ1 rotated with respect to the horizontal of a structure in the first-layer structure group may be adjusted, and at least one of a length of a long axis, a length of a short axis, and an angle θ2 rotated with respect to the horizontal of a structure in the second-layer structure group may be adjusted.

Figure 6:
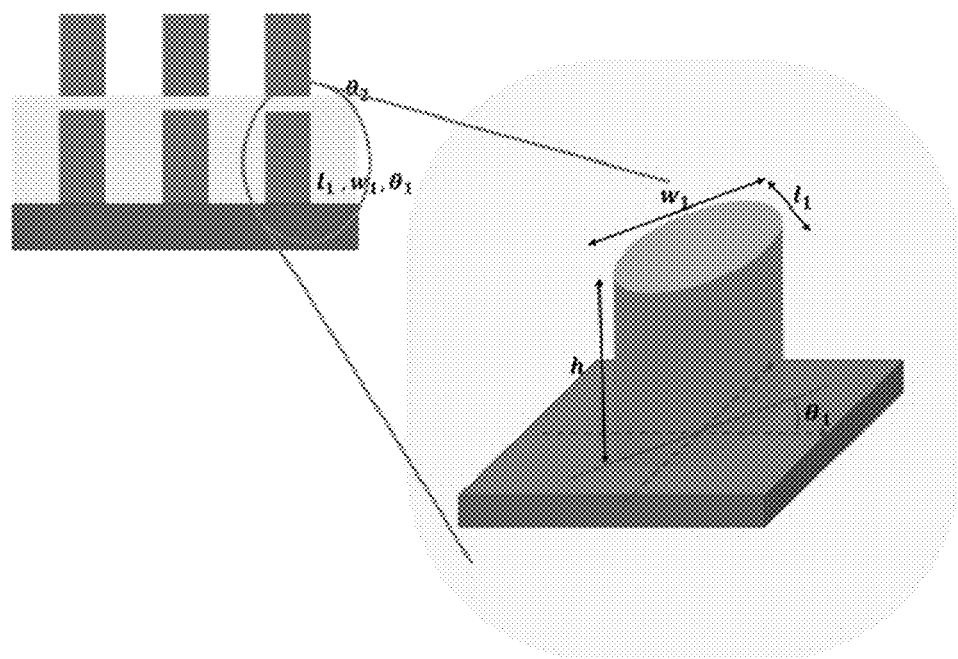
FIGS. 6, 7, 8A, and 8B are views illustrating a detailed configuration of a universal metasurface according to an embodiment of the present disclosure.

As illustrated, the first-layer structure and the second-layer structure may be the same as or different from each other, and for example, when an elliptical structure is used, a metasurface may be adjusted by a length of a long axis, a length of a short axis, and an angle θ1 rotated with respect to the horizontal of the first-layer structure, and a metasurface may be adjusted by a length of a long axis, a length of a short axis, and an angle θ2 rotated with respect to the horizontal of the second-layer structure. For example, as illustrated in FIG. 6, the first-layer structure may include two groups having different lengths of major and minor axes and different rotated angles, and in this case, the number of adjustment factors is 6 by considering the two groups, the lengths of the major and minor axes, and the rotated angle. In addition, when the second-layer structure includes two groups having the same length of the major axis and the minor axis and having different rotated angles, and the number of adjustment factors is 2. Therefore, the metasurface configured as illustrated in FIG. 6 may form independent electric field intensity distributions with respect to incident polarizations perpendicular to each other, by adjusting eight control factors.

Figure 7:
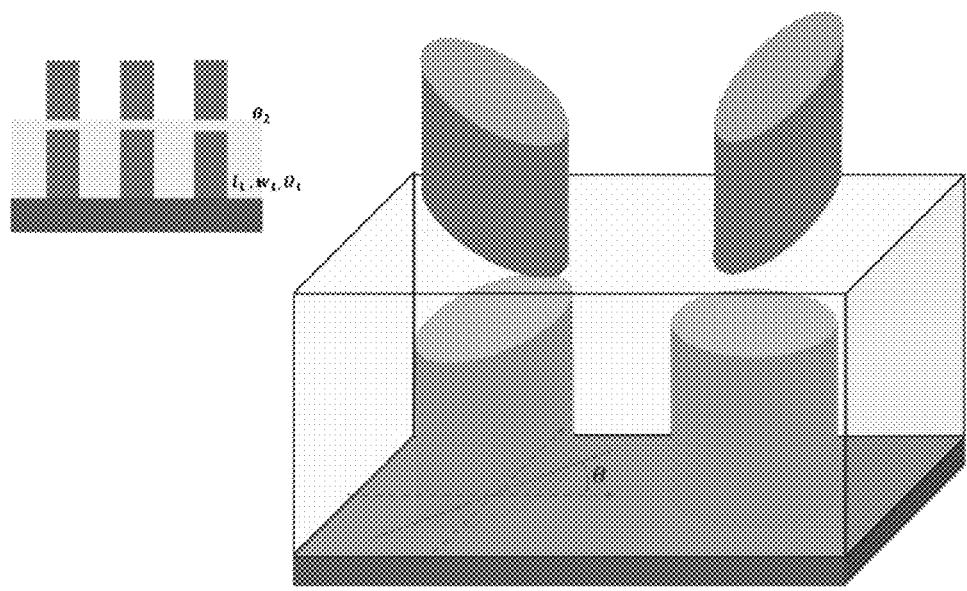
Figure 8A:
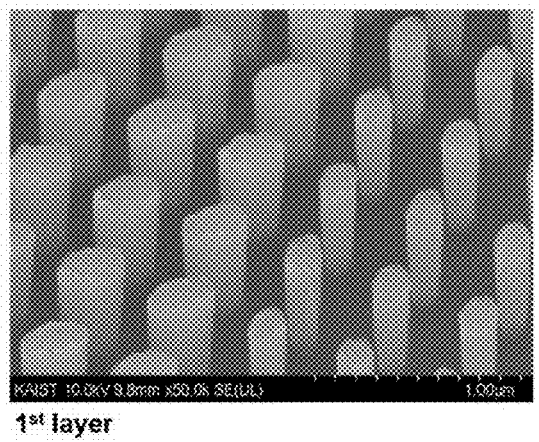
Figure 8B:
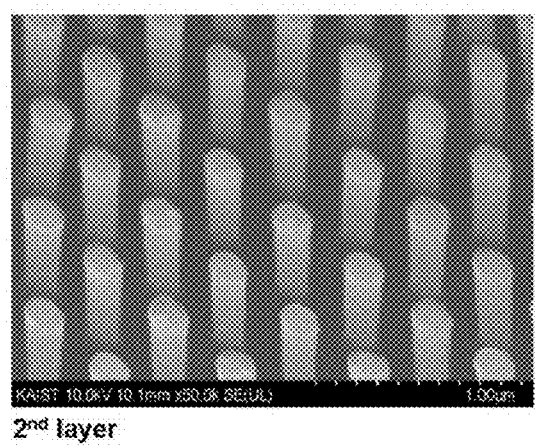

Referring to FIGS. 8A and 8B, actual photos of universal metasurfaces designed parallel to FIG. 7. The universal metasurface may be formed in an array of elliptical nanoposts by patterning each layer of the two-layer metasurface through an E-beam lithography process of two times. Accordingly, because a universal metasurface may be formed through a patterning process through two times of a lithography process, the universal metasurface of the present disclosure has a minimum line width (about 80 nm) that is much larger than a line width of a commercially available dynamic random access memory (DRAM) semiconductor (about 20 nm), and mass production may be sufficiently performed by considering that only two times of patterning is required, unlike semiconductor devices that require dozens of times of patterning.

The universal metasurface 110 may implement a Jones matrix that changes spatially, and accordingly, an electromagnetic field distribution may be generated with a high spatial resolution. That is, the influence of the universal metasurface 110 on electromagnetic waves may be simply represented by a matrix equation by using a Jones matrix and a Jones vector, and the influence of the universal metasurface 110 is represented as one matrix as follows.

$$\begin{bmatrix} E_x \\ E_y \end{bmatrix}_{out} = \begin{bmatrix} J_{11} & J_{12} \\ J_{21} & J_{22} \end{bmatrix} \begin{bmatrix} E_x \\ E_y \end{bmatrix}_{in} \qquad \text{Equation 1}$$

In this case, $[E_x, E_y]_{in}$ represents an electromagnetic wave incident on the universal metasurface 110, and $[Ex, Ey]_{out}$ represents an electromagnetic wave passing through the universal metasurface 110.

Particularly, information on x polarization and y polarization of light may be defined by Equation 2.

$$E = \begin{bmatrix} E_x \\ E_y \end{bmatrix} = \begin{bmatrix} |E_x|e^{i\phi_x} \\ |E_y|e^{i\phi_y} \end{bmatrix} = e^{i\phi_x} \begin{bmatrix} |E_x| \\ |E_y|e^{i(\phi_y-\phi_x)} \end{bmatrix} \qquad \text{Equation 2}$$

In this case, light intensity is defined by $\sqrt{|E_x|+|E_y|}$, and a phase is defined by $\phi_x$.

In addition, a polarization state may be defined by Equation 3.

$$\begin{bmatrix} \frac{|E_x|}{\sqrt{|E_x|^2+|E_y|^2}} \\ \frac{|E_y|}{\sqrt{|E_x|^2+|E_y|^2}} e^{i(\phi_y-\phi_x)} \end{bmatrix} = \begin{bmatrix} \cos x \\ \sin x e^{i\Delta\phi} \end{bmatrix} \qquad \text{Equation 3}$$

The polarization state is defined by a relative ratio $\chi$ and a phase difference $\Delta\phi$ between intensities of x-polarized light and y-polarized light.

Figure 9:
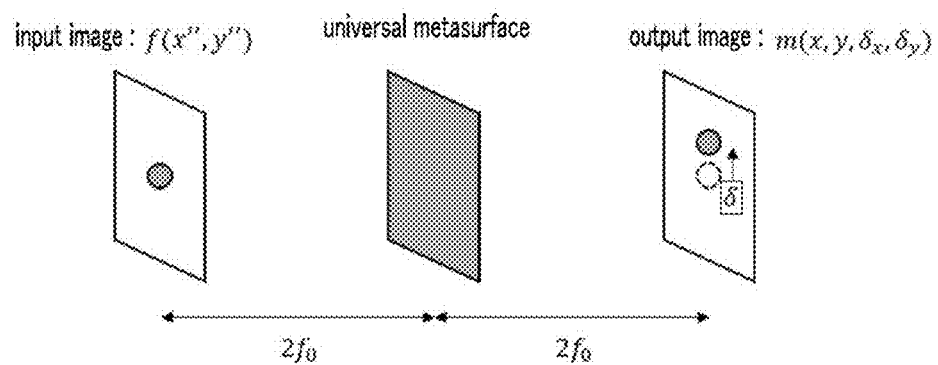
FIG. 9 is a diagram illustrating an operation of a universal metasurface according to an embodiment of the present disclosure.

FIG. 9 is a diagram illustrating an operation of the universal metasurface according to an embodiment of the present disclosure.

Because the universal metasurface 110 performs a function of a lens for adjusting the focus of light and a steering function for adjusting the direction of light, a relationship between an input image and an output image may be represented by the following equation. This is arranged by using Fresnel approximation.

$$m(x,y,\delta_x,\delta_y)=f(\delta_x-x,\delta_y-y)C \qquad \text{Equation 4}$$

That is, an output image of the universal metasurface 110 has a form in which an additional phase term C is further combined with an image $f(\delta_x-x, \delta_y-y)$ that is shifted in parallel by delta δ after the input image is flipped. In this case, C is determined according to a design of the universal metasurface 110 and a structure of an optical system, and the detailed equation for this is as follows.

$$C = \exp\left[j\frac{\pi}{2\lambda f_0}\left(x^2 + (x-\delta_x)^2\right)\right] \qquad \text{Equation 5}$$

-continued $$\exp\left[j\frac{\pi}{2\lambda f_0}(y^2 + (y-\delta_y)^2)\right]\exp\left[j\left(\frac{6\pi f_0}{\lambda} - \frac{\pi}{2}\right)\right]$$

$f_0$: focal length λ: wavelength

In addition, an equation defining the light f(x,y) is as follows.

$$f(x,y) = \alpha(x,y)\exp(i\phi(x,y)) \qquad \text{Equation 6}$$

α represents intensity, and ϕ represents a phase.

In addition, the controller 130 may calculate intensity, a phase, and polarization information of light from the QDIC image and the QRP image which are acquired previously. This process is described in more detail.

First, a method of acquiring information on intensity of x polarization I(x,y) from information on a QDIC image (for example, $$QDIC\frac{\partial \phi_x}{\partial x})$$

is described. As described above, the universal metasurface 110 has a structure in which two layers are overlapped, and through this structure, the x-polarized light passing through the universal metasurface 100 is divided, and some of the x-polarized light is converted into an R-polarized state to generate an image at a point shifted in parallel by, and the other is converted into an L-polarized state to generate an image at a point shifted in parallel by ($\delta_x+\Delta\delta_x$, $\delta_y+\Delta\delta_y$) $\delta_x$, $\delta_y$. Through this, it is possible to generate a QDIC image of which characteristics are defined by $\Delta\delta_x$ and $\Delta\delta_y$ at a point of ($\delta_x$, $\delta_y$). In this case, when the input image has a shape of f(x,y), the equation for an output electromagnetic field on an imaging surface after passing through the universal metasurface 110 is represented as follows.

$$E(x, y) = m(x, y, \delta_x + \Delta\delta_x + \Delta\delta_y)|R\rangle + m(x, y, \delta_x, \delta_y)|L\rangle \approx \qquad \text{Equation 7}$$

$$C\left[f(\delta_x + \Delta\delta_x - x, \delta_y + \Delta\delta_y - y)\exp\left[j\frac{\pi}{\lambda f_0}(\delta_x - x)\Delta\delta_x\right]\right.$$

$$\exp\left[j\frac{\pi}{\lambda f_0}(\delta_y - y)\Delta\delta_y\right]|R\rangle + f(\delta_x - x, \delta_y - y)|L\rangle\right] =$$

$$C\left[\alpha(\delta_x + \Delta\delta_x - x, \delta_y + \Delta\delta_y - y)\exp\left[j\left(\phi(\delta_x + \Delta\delta_x - x, \right.\right.\right.$$

$$\delta_y + \Delta\delta_y - y) + \frac{\pi}{\lambda f_0}(\delta_x - x)\Delta\delta_x + \frac{\pi}{\lambda f_0}(\delta_y - y)\Delta\delta_y\right)\right]|R\rangle +$$

$$\alpha(\delta_x - x, \delta_y - y)\exp(i\phi(\delta_x - x, \delta_y - y))|L\rangle\right]$$

In this case, a passive metasurface is used, and accordingly, E may be properly normalized for energy conservation. Also, due to orthogonality between the R-polarized light and the L-polarized light, the intensity of overlapped light may be represented by a simple sum of the respective intensities of the R-polarized light and the L-polarized light. In addition, $\Delta\delta_x$ and $\Delta\delta_y$ have small values, thereby being able to be approximated as defined by Equation 8.

$$I(x, y) = |E(x, y)|^2 = \qquad \text{Equation 8}$$

$$|\alpha(\delta_x + \Delta\delta_x - x, \delta_y + \Delta\delta_y - y)|^2 + |\alpha(\delta_x - x, \delta_y - y)|^2 \approx$$

$$2|\alpha(\delta_x - x, \delta_y - y)|^2 \text{ Using } t = \delta_x - x \text{ and } s = \delta_y - y$$

$$|\alpha(t, s)|^2 = \frac{1}{2}|E(\delta_x - t, \delta_y - s)|^2 = \frac{1}{2}I(\delta_x - t, \delta_y - s)$$

In this case, because the polarization sensor 120 may directly measure the intensity, information on $|E_x|$ and $|E_y|$ may be acquired based on measured values of the polarization sensor 120.

Next, a method of acquiring a phase $\phi_x$ of x polarization from a QDIC image (for example, $$QDIC\frac{\partial \phi_x}{\partial x}$$

is described.

FIGS. 10A, 10B, 11A, 11B, 11C, 11D, 11E, and 11F illustrate a process of measuring a phase by using a universal metasurface according to an embodiment of the present disclosure.

Figure 10A:
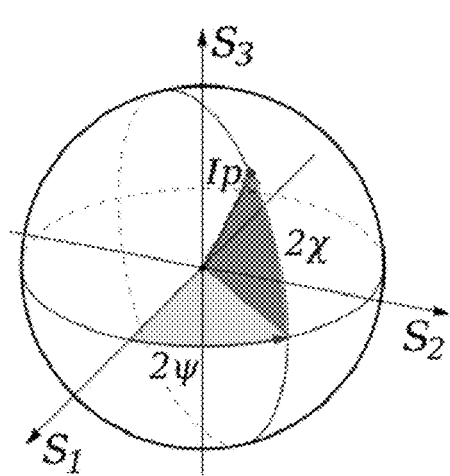
Figure 10B:
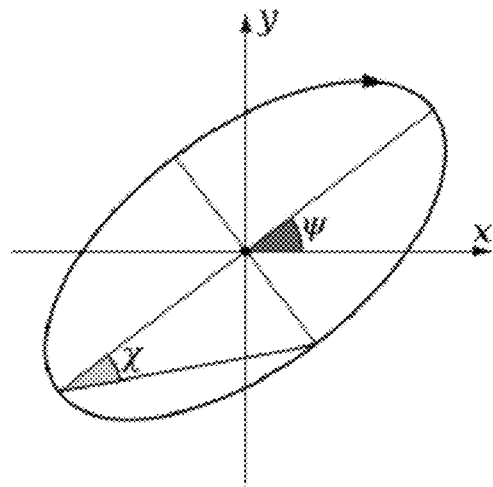

As illustrated in FIGS. 10A and 10B, when circular polarizations orthogonal to each other overlap each other due to orthogonality between R polarization and L polarization, a phase difference between the R polarization and the L polarization determines an azimuth angle θ on the Poincare sphere, which is related to a rotation angle ψ of a polarization ellipse at each point. In this case, slope information of a phase is determined by an azimuth angle according to an equation below. In this case, the azimuth angle is a value that may be directly measured by the polarization sensor 120.

$$\theta(x, y) = 2\psi = \phi_{LCP} - \phi_{RCP} = \phi(\delta_x - x, \delta_y - y) - \qquad \text{Equation 9}$$

$$\phi(\delta_x + \Delta\delta_x - x, \delta_y + \Delta\delta_y - y) - \frac{\pi}{\lambda f_0}(\delta_x - x)\Delta\delta_x - \frac{\pi}{\lambda f_0}(\delta_y - y),$$

Using $t = \delta_x - x$ and $s = \delta_y - y$ $$\Delta\phi(t, s) =$$

$$\phi(t + \Delta\delta_x, s + \Delta\delta_y) - \phi(t, s) = -\theta(\delta_x - t, \delta_y - s) - \frac{\pi}{\lambda f_0}\Delta\delta_x t - \frac{\pi}{\lambda f_0}\Delta\delta_y s$$

In addition, a phase for x polarization and a phase for y polarization may be quantified by a following equation.

$$\phi_x(x, y) = \phi_x(x_0, y_0) + \int_{x_0}^{x}\frac{\partial \phi_x}{\partial x}(x, y_0)dx + \int_{y_0}^{y}\frac{\partial \phi_y}{\partial y}(x, y)dy \qquad \text{Equation 10}$$

$$\phi_y(x, y) = \phi_y(x_0, y_0) + \int_{x_0}^{x}\frac{\partial \phi_y}{\partial x}(x, y_0)dx + \int_{y_0}^{y}\frac{\partial \phi_y}{\partial y}(x, y)dy$$

In this case, because slopes $$\frac{\partial \phi_x}{\partial x}, \frac{\partial \phi_x}{\partial y}, \frac{\partial \phi_y}{\partial x}, \frac{\partial \phi_y}{\partial y}$$

for x polarization and y polarization may be acquired from a QDIC image, information necessary for applying Equation 8 is $\phi_x(x_0, y_0)$ and $\phi_y(x_0, y_0)$. The method of Equation 10 is one of methods for calculating a phase, and may be modified in various ways because there are various integration paths.

In order to describe in more detail the process of acquiring the phase, it is assumed that FIG. 11A is an input image as illustrated in FIGS. 11A to 11F. In general, a phase changes significantly as a position of an imaging plane moves at a wavelength level, and accordingly, it is important to measure a relative value after assuming a specific phase for a certain point or background rather than an absolute phase. Therefore, it is assumed that a phase of x polarization at an original point (a black point) in FIG. 11B is a random constant. That is, a phase $\phi_x(x_0, y_0)$ of the x polarization at the original point may be known. Next, as illustrated in FIG. 11C, by integrating a slope $$QDIC \frac{\partial \phi_x}{\partial x}$$

of a phase of the x polarization acquired from a QDIC image, the phase $\phi_x(x, y_0)$ of the x polarization may be obtained at a position corresponding to a black line. Next, as illustrated in FIG. 11D, a relative phase difference between x polarization and y polarization may be known quantitatively from a QRP image, and accordingly, when QRP is used, a phase $\phi_y(x, y_0)$ of the y polarization in a region corresponding to the black line may be obtained. Next, as illustrated in FIG. 11E, by integrating a slope $$QDIC \frac{\partial \phi_y}{\partial y}$$

for a phase of the y polarization acquired from the QDIC image, the phase $\phi_y(x, y)$ of the y polarization of the entire region may be obtained. Finally, as illustrated in FIG. 11F, when the relative phase difference between the x polarization and the y polarization acquired from the QRP image is applied to the phase $\phi_y(x, y)$ of the y polarization of the entire region, a phase $\phi_x(x, y)$ of the x polarization of the entire region may be obtained. In addition, the method presented in FIGS. 11A to 11F is an example of one of several methods of extracting phase information, and phase information may be extracted through another path by using the given information, and accordingly, more reliable information may be extracted.

In addition, the QRP image described above is described in more detail. The QRP image is used to measure a relative phase difference between x polarization and y polarization. To this end, the universal metasurface 110 converts x polarization information into R polarization and converts y polarization information into L polarization, and an output image of the universal metasurface 110 is represented as follows.

$$|x\rangle \rightarrow m_x(x, y, 0, 0)|R\rangle \quad \text{Equation 11}$$

$$|y\rangle \rightarrow m_y(x, y, 0, 0)|L\rangle$$

$$E(x, y) = m_x(x, y, 0, 0)|R\rangle + m_y(x, y, 0, 0)|L\rangle \approx C[f_x(-x, -y)|R\rangle +$$

$$f_y(-x, -y)|L\rangle] =$$

$$C[\alpha_x(-x, -y)\exp(i\phi_x(-x, -y))|R\rangle + \alpha_{yt}(-x, -y)\exp(i\phi_y(-x, -y))|L\rangle]$$

$$\theta(x, y) = 2\psi = \phi_{LCP} - \phi_{RCP} = \phi_y(-x, -y) - \phi_x(-x, -y)$$

-continued

Using $t = \delta_x - x$ and $s = \delta_y - y$ $$\Delta \phi(t, s) = \phi_y(t, s) - \phi_x(t, s) = \theta(-t, -s)$$

In this case, an azimuth angle θ in the QRP image may be measured by the polarization sensor 120, and accordingly, the relative phase difference between x polarization and y polarization may be measured.

As such, a phase of x polarization and a phase of y polarization may be quantitatively calculated by using slopes of x polarization and y polarization acquired from a QDIC image and a phase difference between the phase of the x polarization and the phase of the y polarization acquired from the QRP image. In addition, a polarization state is defined by a relative ratio χ between intensities of x polarization and y polarization and the phase difference Δϕ. Therefore, information on the polarization state may be quantitatively calculated by using the previously calculated light intensity and phase difference.

FIG. 12 is a mathematical representation of a function performed by a universal metasurface according to an embodiment of the present disclosure.

The universal metasurface illustrated in FIG. 3 or 5 generates QDIC images $$QDIC \frac{\partial \phi_x}{\partial y} \text{ and } QDIC \frac{\partial \phi_x}{\partial x}$$

for x polarization, QDIC images $$QDIC \frac{\partial \phi_y}{\partial y} \text{ and } QDIC \frac{\partial \phi_y}{\partial x}$$

for y polarization, and generates a QRP image between x polarization and y polarization.

The equation of FIG. 12 represents a function of the universal metasurface, which may be represented as matrix multiplication between an input and an output. A function $g(\delta_x, \delta_y, f_0)$ illustrated in FIG. 12 is a function for representing a function of a lens for adjusting a focus of light performed by the universal metasurface and a steering function for adjusting a direction of light. In this case, the function may be represented as a Jones matrix that connects the input to the output, and because the metasurface according to the present disclosure may implement a certain Jones matrix as described above, a universal metasurface that implements the equation of FIG. 12 may be designed and manufactured.

Figure 13:
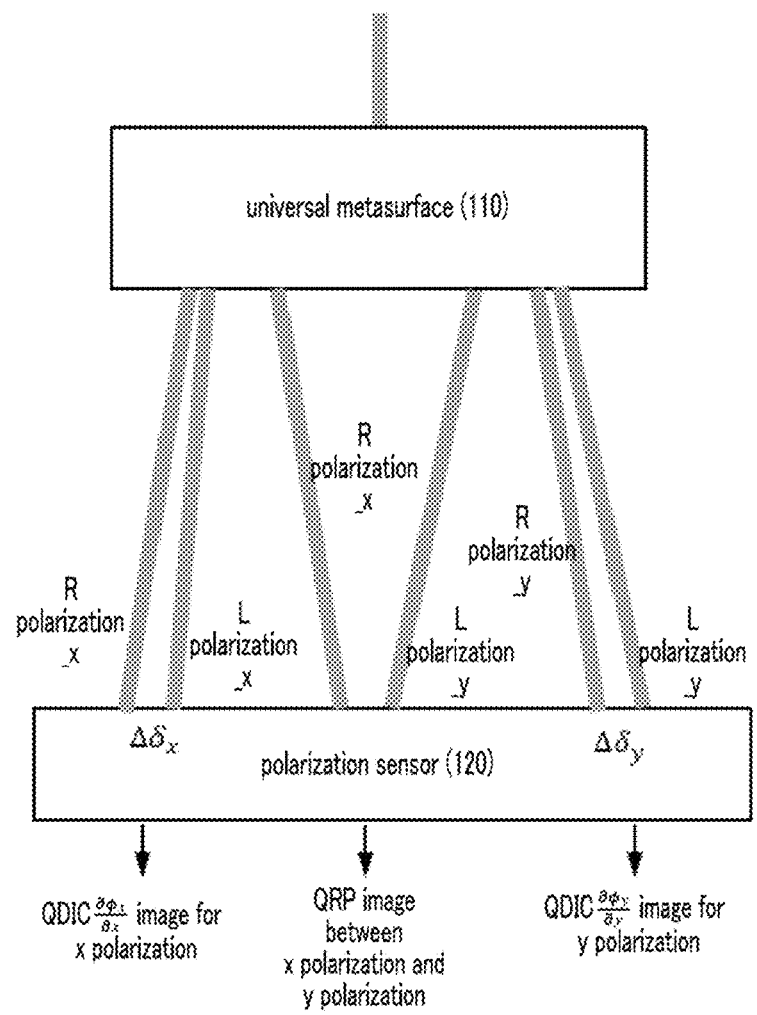
FIG. 13 illustrates a configuration of an optical measurement device according to a second embodiment of the present disclosure.
Figure 14:
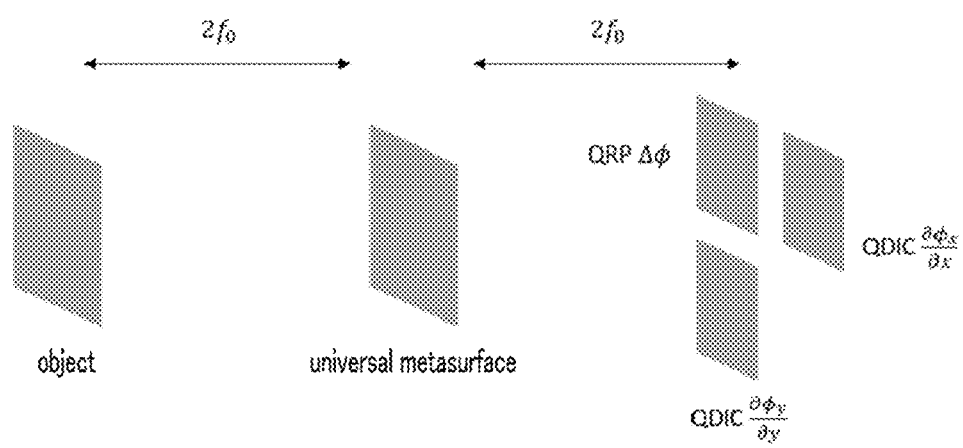
FIG. 14 is a diagram illustrating an operation of the optical measurement device according to the second embodiment of the present disclosure.

FIG. 13 illustrates a configuration of an optical measurement device according to a second embodiment of the present disclosure, and FIG. 14 is a diagram illustrating an operation of the optical measurement device according to the second embodiment of the present disclosure.

As illustrated in FIG. 14, the universal metasurface 110 acquires x polarization of incident light and y polarization of the incident light, and provides R polarization for x polarization, L polarization for x polarization, R polarization for y polarization, and L polarization for y polarization, and enables a QDIC image for x polarization, a QDIC image for y polarization, and a QRP image between x polarization and y polarization to be collected by the polarization sensor 120.

Unlike the embodiment of FIG. 3, a QDIC image $$QDIC\frac{\partial \phi_x}{\partial x}$$

for x polarization may be generated by using R polarization and L polarization from the x polarization with a small difference $\Delta\delta_x$ in the x-axis direction, and a QDIC image $$QDIC\frac{\partial \phi_y}{\partial y}$$

for y polarization may be generated by using R polarization and L polarization from the y polarization with a small difference $$QDIC\frac{\partial \phi_y}{\partial y}$$

in the y-axis direction In addition, a QRP image between x polarization and y polarization is generated.

In this case, a process of calculating light intensity, a phase, and polarization information from each of the QDIC image and the QRP image is similar to the process of the first embodiment. As described above, the intensity of x polarization may also be acquired from only one of $$QDIC\frac{\partial \phi_x}{\partial x} \text{ and } QDIC\frac{\partial \phi_x}{\partial y}, \text{ but } QDIC\frac{\partial \phi_x}{\partial x}$$

is acquired in the second embodiment, and accordingly, intensity of x polarization may be obtained by the following equation by using this. Similarly, intensity of y polarization may be obtained from $$QDIC\frac{\partial \phi_y}{\partial y}.$$

Equation 12

$$I(x, y) = |E(x, y)|^2 = |\alpha(\delta_x + \Delta\delta_x - x, \delta_y + \Delta\delta_y - y)|^2 + |\alpha(\delta_x - x, \delta_y - y)|^2 \approx$$

$$2|\alpha(\delta_x - x, \delta_y - y)|^2 \text{ Using } t =$$

$$\delta_x - x \text{ and } s = \delta_y - |\alpha(t, s)|^2 = \frac{1}{2}|E(\delta_x - t, \delta_y - s)|^2 = \frac{1}{2}I(\delta_x - t, \delta_y - s)$$

In addition, according to the process described with reference to FIG. 11, a phase of x polarization and a phase of y polarization may be quantitatively calculated by using slopes of x polarization and y polarization acquired from a QDIC image and a phase difference between x polarization and y polarization acquired from a QRP image. In addition, because a polarization state is defined by a relative ratio χ and a phase difference Δφ between intensities of x-polarized light and y-polarized light, information on the polarization state may be quantitatively calculated by using the previously calculated light intensity and phase difference.

FIG. 15 mathematically represents a function performed by the universal metasurface according to the second embodiment of the present disclosure.

The universal metasurface illustrated in FIG. 13 or 14 generates a QDIC image $$QDIC\frac{\partial \phi_x}{\partial_x}$$

for x polarization, generates a QDIC image $$QDIC\frac{\partial \phi_y}{\partial_y}$$

for y polarization, and generates a QRP image between x polarization and y polarization.

The equation in FIG. 15 represents the function of the universal metasurface, which may be represented by matrix multiplication between an input and an output. A function $g(\delta_x, \delta_y, f_0)$ illustrated in FIG. 15 is a function for representing a function of a lens for adjusting a focus of light performed by the universal metasurface and a steering function for adjusting a direction of light. In this case, the function may be represented as a Jones matrix that connects the input to the output, and because the metasurface according to the present disclosure may implement a certain Jones matrix as described above, a universal metasurface that implements the equation of FIG. 15 may be designed and manufactured.

Figure 17:
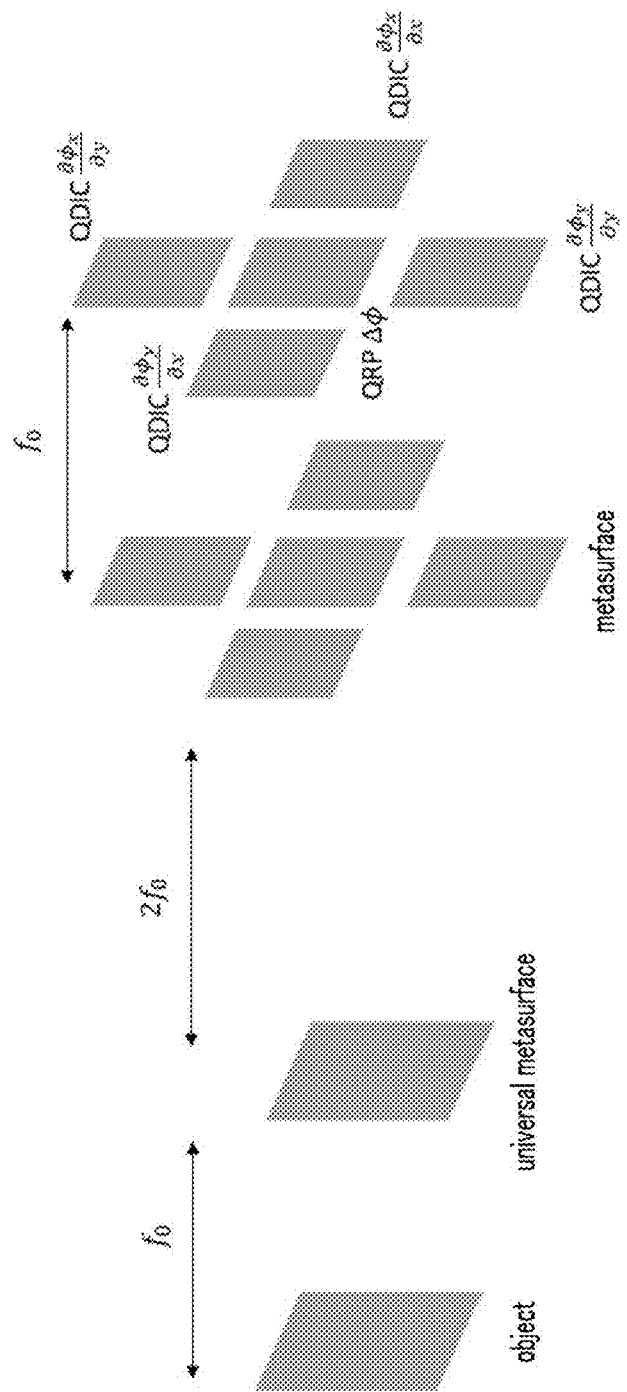
FIG. 17 is a diagram illustrating an operation of the optical measurement device according to the third embodiment of the present disclosure.

FIG. 16 illustrates a configuration of an optical measurement device according to a third embodiment of the present disclosure, and FIG. 17 is a diagram illustrating an operation of the optical measurement device according to the third embodiment of the present disclosure.

FIGS. 16 and 17 are characterized in that a metasurface 140 of an array type is further added between the universal metasurface 110 and the polarization sensor 120 according to the first embodiment illustrated in FIG. 3. The metasurface 140 transfers a QDIC image and a QRP image generated by the universal metasurface 110 to the polarization sensor 120. Through this, the spatial dependence of phase terms in an output image existing in the above embodiments may be removed, and a sensitive error associated with measurement may be greatly reduced, and thus, the accuracy of phase measurement may be increased.

A process of calculating light intensity, a phase, and polarization information of this configuration is substantially the same as the process in the first embodiment described above.

Figure 18:
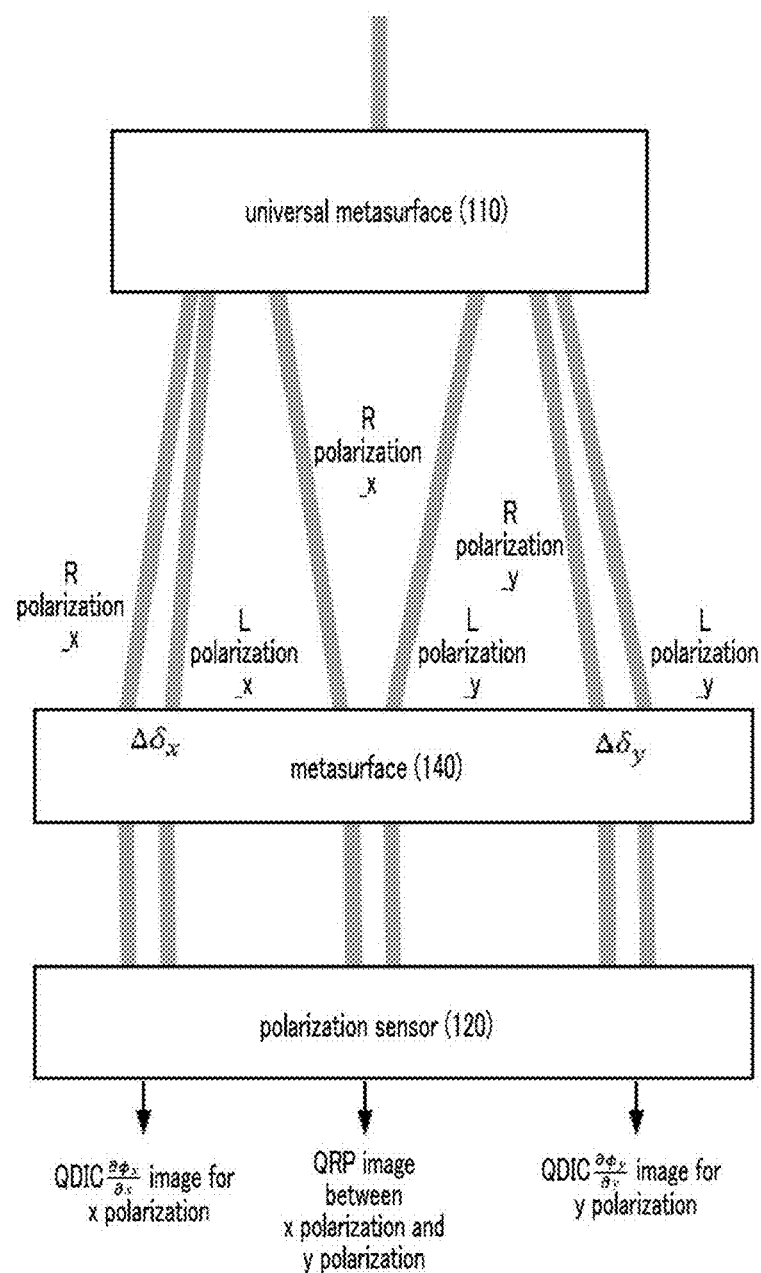
FIG. 18 illustrates a configuration of an optical measurement device according to a fourth embodiment of the present disclosure.
Figure 19:
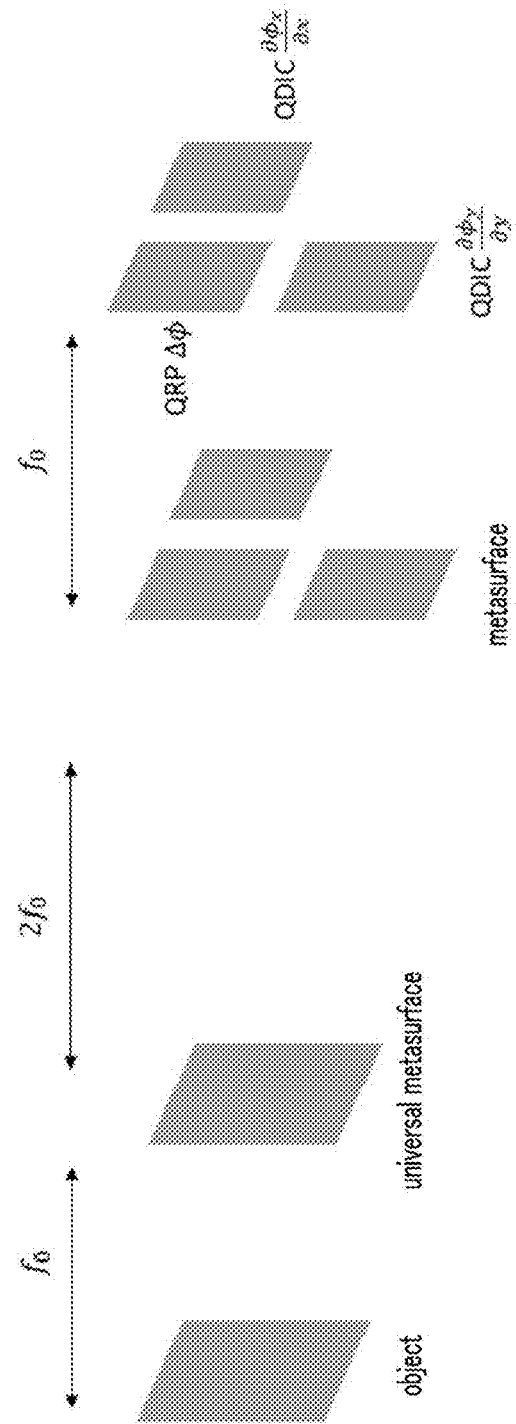
FIG. 19 is a diagram illustrating an operation of the optical measurement device according to the fourth embodiment of the present disclosure.

FIG. 18 illustrates a configuration of an optical measurement device according to a fourth embodiment of the present disclosure, and FIG. 19 is a diagram illustrating an operation of the optical measurement device according to the fourth embodiment of the present disclosure.

FIGS. 18 and 19 are characterized in that a metasurface 140 of an array type is further added between the universal metasurface 110 and the polarization sensor 120 according to the second embodiment illustrated in FIG. 13. A process of calculating light intensity, a phase, and polarization information of this configuration is substantially the same as the process in the second embodiment described above.

Figure 20:
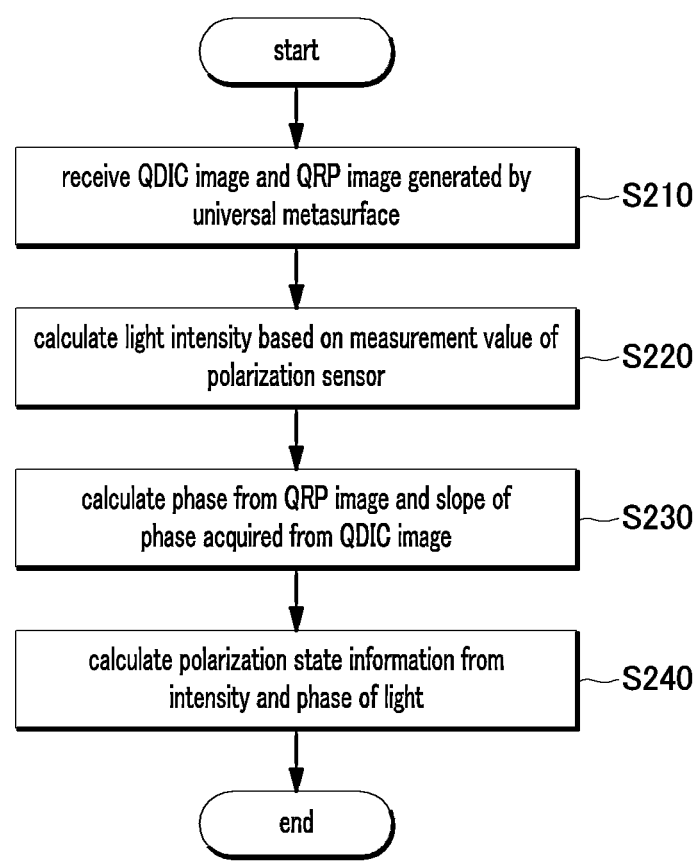
FIG. 20 is a flowchart illustrating an operating method of an optical measurement device, according to an embodiment of the present disclosure.

FIG. 20 is a flowchart illustrating an operating method of an optical measurement device, according to an embodiment of the present disclosure.

First, a QDIC image for x polarization, a QDIC image for y polarization, and a QRP image representing a relative phase difference between the x polarization and the y polarization are generated by the universal metasurface 120 of the optical measurement device 100, and the images are measured by the polarization sensor 120 (S210).

The controller 130 calculates light intensity of input light based on a measurement value of the polarization sensor 120 (S220).

The polarization sensor 120 may directly measure intensity and acquires information on magnitudes of x polarization |$E_x$| and y polarization |$E_y$| by applying the intensity to Equation 8 described above, Next, phase information is calculated from the QRP image and a slope of the phase acquired from the QDIC image (S230).

As illustrated in FIG. 11, a phase $\phi_x(x, y_0)$ of x polarization is obtained by integrating a slope $$QDIC \frac{\partial \phi_x}{\partial_x}$$

of the phase of x polarization collected by the polarization sensor 120, a phase $\phi_y(x, y_0)$ of y polarization is obtained from the phase $\phi_x(x, y_0)$ of the x polarization based on a relative phase difference between x polarization and y polarization acquired from the QRP image, a phase of y polarization of the entire region is obtained by integrating the phase of y polarization with the slope of the phase of y polarization, and a phase of x polarization is $\phi_y(x, y)$ calculated by applying $\phi_y(x, y_0)$ the relative $$QDIC \frac{\partial \phi_y}{\partial_y}$$

phase $\phi_x(x, y)$ difference between x polarization and y polarization acquired from the QRP image to the phase $\phi_y(x, y)$ of y polarization.

Next, polarization state information is calculated from the previously obtained information on intensity and a phase of light (S240).

By using Equation 3 described above, information on the polarization state is calculated from the relative ratio $\chi$ between intensities of x polarization and y polarization and the phase difference between x polarization and y polarization.

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the methods and systems of the present disclosure are described with reference to specific embodiments, some or all of their components or operations may be implemented by using a computer system having a general-purpose hardware architecture.

The above description of the present application is for illustrative purposes, and those skilled in the art to which the present disclosure belongs may understand that the present disclosure may be easily modified into other specific forms without changing the technical idea or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the claims described below rather than the detailed description above, and all changes or modifications derived from the meaning and scope of the claims and equivalent concepts those are interpreted to be included in the scope of the present disclosure.

What is claimed is:

1. An optical measurement device, comprising:
a universal metasurface on which light is incident;
a polarization sensor configured to measure a polarization state of light passing through the universal metasurface; and
a controller configured to collect a quantitative differential interference contrast (QDIC) image for the x polarization of incident light that is collected by the polarization sensor, a QDIC image for y polarization, and a quantitative relative phase (QRP) image representing a relative phase difference between the x polarization and y polarization and configured to calculate intensity, a phase or polarization information of the incident light.

2. The optical measurement device of claim 1, wherein the universal metasurface generates a QDIC image $$QDIC \frac{\partial \phi_x}{\partial_x}$$

and a QDIC image $$QDIC \frac{\partial \phi_x}{\partial_y}$$

for x polarization and a QDIC image $$QDIC \frac{\partial \phi_y}{\partial_y}$$

and a QDIC image $$QDIC \frac{\partial \phi_y}{\partial_x}$$

for y polarization, and generates the QRP image representing the relative phase difference between the x polarization and the y polarization.

3. The optical measurement device of claim 1, wherein the universal metasurface generates a QDIC image $$QDIC \frac{\partial \phi_x}{\partial_x}$$

for x polarization, and a QDIC image $$QDIC \frac{\partial \phi_y}{\partial y}$$

for y polarization, and generates the QRP image representing the relative phase difference between the x polarization and the y polarization.

4. The optical measurement device of claim 1, further comprising:
a metasurface arranged between the universal metasurface and the polarization sensor and configured to transmit the QDIC image and the QRP image generated by the universal metasurface to the polarization sensor.

5. The optical measurement device of claim 1, wherein the controller measures the intensity of the incident light through the polarization sensor.

6. The optical measurement device of claim 1, wherein the controller obtains a phase $\phi_x(x, y_0)$ of x polarization by integrating a slope $$QDIC \frac{\partial \phi_x}{\partial x}$$

of the phase of x polarization collected by the polarization sensor, a phase of y polarization $\phi_y(x, y_0)$ from the phase $\phi_x(x, y_0)$ of the x polarization based on a relative phase difference between x polarization and y polarization acquired from the QRP image, a phase of y polarization of an entire region is obtained by integrating the phase of y polarization with $\phi_y(x, y)$ the $\phi_y(x, y_0)$ slope $$QDIC \frac{\partial \phi_y}{\partial y}$$

of the phase of y polarization, and calculates a phase $\phi_x(x, y)$ of x polarization by applying the relative phase between x polarization and y polarization acquired from the QRP image to the phase $\phi_y(x, y)$ of y polarization.

7. The optical measurement device of claim 1, wherein the controller calculates information on a polarization state from a relative ratio $\chi$ between intensities of the x polarization and the y polarization and a phase difference between the x polarization and the y polarization.

8. The optical measurement device of claim 1, wherein the universal metasurface includes a first-layer metasurface and a second-layer metasurface as a dual-layer metasurface.

9. The optical measurement device of claim 8, wherein the first-layer metasurface is formed on a substrate and includes a first host material and a first plurality of structures,
the second-layer metasurface is formed on the first-layer metasurface and includes a second plurality of structures, and
the first plurality of structures and the second plurality of structures are arranged independently and apart from each other.

10. The optical measurement device of claim 9, wherein each of the first plurality of structures and the second plurality of structures has one shape of a rectangular parallelepiped, an ellipsoid, a semi-ellipsoid, and a lying semi-cylindrical shape.

11. The optical measurement device of claim 9, wherein the first plurality of structures include two or more first-layer structure groups,
each of the first-layer structure groups includes structures having different shapes,
the second plurality of structures include two or more second-layer structure groups, and
each of the second-layer structure group includes structures having the same shape.

12. The optical measurement device of claim 11, wherein the first plurality of structures and the second plurality of structures each have an elliptical column shape,
at least one of a length of a long axis, a length of a short axis, and an angle rotated with respect to a horizontal of each of the structures in the first-layer structure group is adjusted, and
at least one of a length of a long axis, a length of a short axis, and an angle rotated with respect to a horizontal of each of the structures in the second-layer structure group is adjusted.

13. An operating method of an optical measurement device including a universal metasurface, the operating method comprising:
measuring, through a polarization sensor, a quantitative differential interference contrast (QDIC) image for x polarization generated through the universal metasurface of the optical measurement device, a QDIC image for y polarization, and a quantitative relative phase (QRP) image representing a relative phase difference between the x polarization and the y polarization;
calculating light intensity of input light based on a measurement value of the polarization sensor;
calculating a phase of the x polarization and a phase of the y polarization from the QRP image and a slope of a phase acquired from the QDIC image and; and
calculating polarization state information based on the light intensity, the phase of the x polarization, and the phase of the y polarization.

14. The operating method of claim 13, wherein the calculating of the phase of the x polarization and the phase of the y polarization comprises:
calculating a phase $\phi_x(x, y_0)$ of the x polarization by integrating a slope $$QDIC \frac{\partial \phi_x}{\partial x}$$

of the phase of the x polarization collected by the polarization sensor;
calculating a phase $\phi_y(x, y_0)$ of they polarization from the phase $\phi_x(x, y_0)$ of the x-polarization based on the relative phase difference between the x polarization and the y polarization acquired from the QRP image;
calculating a phase $\phi_y(x, y)$ of the y polarization of an entire region by integrating a slope $$QDIC \frac{\partial \phi_y}{\partial y}$$

of the y polarization with the phase $\phi_y(x, y_0)$ of the y polarization; and calculating a phase $\phi_x(x, y)$ of the x polarization by applying the relative phase difference between the x polarization and the y polarization acquired from the QRP image to the phase $\phi_y(x, y)$ of the y polarization.

15. The operating method of claim 13, wherein:
in the calculating of the polarization state information, information on a polarization state is calculated from a relative ratio $\chi$ between intensities of the x polarization and the y polarization and a phase difference between the x polarization and the y polarization.

16. The optical measurement device of claim 2, further comprising:
a metasurface arranged between the universal metasurface and the polarization sensor and configured to transmit the QDIC image and the QRP image generated by the universal metasurface to the polarization sensor.

17. The optical measurement device of claim 3, further comprising:
a metasurface arranged between the universal metasurface and the polarization sensor and configured to transmit the QDIC image and the QRP image generated by the universal metasurface to the polarization sensor.

* * * * *